United States Patent
Takahashi et al.

(10) Patent No.: US 6,868,158 B2
(45) Date of Patent: Mar. 15, 2005

(54) ECHO PROCESSING APPARATUS

(75) Inventors: Shinya Takahashi, Tokyo (JP); Bunkei Matsuoka, Tokyo (JP); Ikuo Kajiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 10/333,224

(22) PCT Filed: May 20, 2002

(86) PCT No.: PCT/JP02/04860
§ 371 (c)(1),
(2), (4) Date: Jan. 21, 2003

(87) PCT Pub. No.: WO02/095975
PCT Pub. Date: Nov. 28, 2002

(65) Prior Publication Data
US 2003/0156711 A1 Aug. 21, 2003

(30) Foreign Application Priority Data
May 22, 2001 (JP) ....................................... 2001-152888

(51) Int. Cl.⁷ .............................................. H04M 1/00
(52) U.S. Cl. ............................. 379/406.04; 379/406.06
(58) Field of Search ....................... 379/406.01, 406.04, 379/406.07, 406.08, 406.09, 406.02, 406.05, 406.06, 406.14

(56) References Cited
U.S. PATENT DOCUMENTS
6,704,415 B1 * 3/2004 Katayama et al. ..... 379/406.01

FOREIGN PATENT DOCUMENTS

| JP | 01-198155 | 8/1989 |
|---|---|---|
| JP | 06-202669 | 7/1994 |
| JP | 07-66756 | 3/1995 |
| JP | 08-256089 | 10/1996 |
| JP | 09-205388 | 8/1997 |
| JP | 10-242891 | 9/1998 |
| JP | 11-289283 | 10/1999 |
| JP | 2000-101484 | 4/2000 |

OTHER PUBLICATIONS

Hiroshi Rikimaru: "Chokakukei ni okeru joho shori no kozo" Suri Kagaku, vol. 36, No. 1, pp. 22–33 Jan. 01, 1998.
Yuriko Tsukahara et al.: "Echo canceller noise canceller heiyo ni okeru kadai to taisaku" 1994–Nen the Institute of Electronics, Information and Communication Engineers Shuki Taikai Koen Ronbunshu, p. B–331 Nov. 05, 1994.
Steven F. Boll: "Suppression of acoustic noise in speech using spectral subtraction" IEEE Transactions on Accousics, Speech, and Signal Processing, vol. ASSP–27, No. 2, pp. 113–120 04/79.

* cited by examiner

Primary Examiner—Forester W. Isen
Assistant Examiner—Jefferey F. Harold
(74) Attorney, Agent, or Firm—Oblon, Spivak, McClelland, Maier & Neustadt, P.C.

(57) ABSTRACT

An echo canceller has a high-pass filter 11, a speaker 3, an A/D converter 6, and an echo canceller 7. The high-pass filter 11 suppresses a low-frequency component in a received signal. The speaker 3 outputs an acoustic sound of a low-frequency suppressed received signal passed through the high-pass filter 11. The A/D converter 6 converts an acoustic echo from a microphone 4 into a transmission signal of a digital form. The echo canceller 7 generates a pseudo echo signal based on the low-frequency suppressed received signal passed through the high-pass filter 11, and eliminates the acoustic echo to be inputted to the microphone 4 from the speaker 3 by subtracting the pseudo echo signal from the digital signal converted by the A/D converter 6.

12 Claims, 6 Drawing Sheets

FIG.3A
RECEIVED SIGNAL

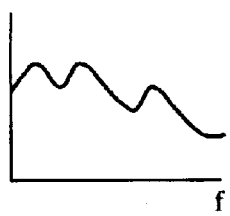

FIG.3B
HIGHPASS FILTER RESPONSE

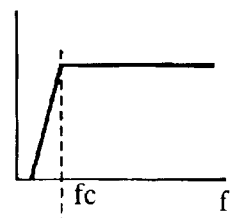

FIG.3C
LOW-FREQUENCY SUPPRESSED RECEIVED SIGNAL

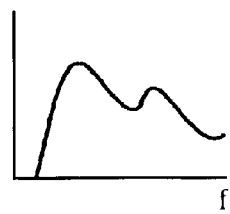

FIG.3D
LOW-FREQUENCY SUPPRESSED RECEIVED SIGNAL

FIG.3E
LOWPASS FILTER RESPONSE

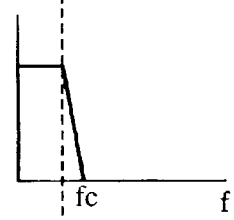

FIG.3F
LOWPASS FILTER OUTPUT

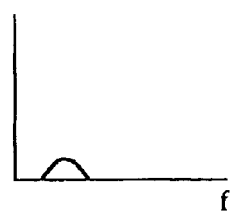

FIG.3G
NEAR-END SIGNAL (ONLY ECHO SIGNAL)

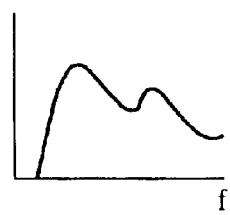

FIG.3H
LOWPASS FILTER RESPONSE

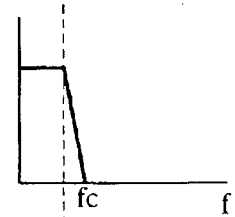

FIG.3I
LOWPASS FILTER OUTPUT

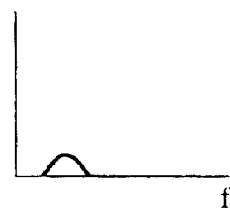

FIG.3J
NEAR-END SIGNAL (ECHO SIGNAL + SOUND SIGNAL FROM NEAR-END TALKER)

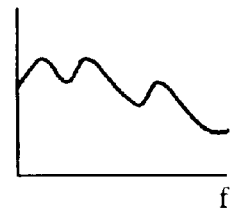

FIG.3K
LOWPASS FILTER RESPONSE

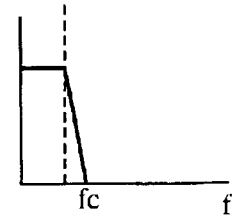

FIG.3L
LOWPASS FILTER OUTPUT

ECHO PROCESSING APPARATUS

TECHNICAL FIELD

The present invention relates to an echo processor for reducing an acoustic echo component outputted from a speaker inputted to a microphone transferred through an echo path in an acoustic communication using mobile units such as an on-vehicle telephone and a cellular phone.

BACKGROUND ART

FIG. 1 is a block diagram showing a configuration of a circuit of a conventional echo processor. In the diagram, reference number 1 designates a digital to analogue (D/A) converter for converting a received signal in digital form to a sound signal in analogue form, 2 denotes an amplifier for amplifying the sound signal, and 3 indicates a speaker for outputting the acoustic corresponding to the sound signal amplified. Reference number 4 designates a microphone for inputting an acoustic and converting it to a sound signal, 5 denotes an amplifier for amplifying the sound signal, and 6 indicates an analogue to digital (A/D) converter for converting the amplified sound signal to a digital signal. Reference number 7 designates an echo canceller for generating a pseudo echo signal based on the digital received signal, subtracting the pseudo echo signal from the near-end signal converted by and then outputted from the A/D converter 6 in order to eliminate the echo signal component. In the echo canceller 7, reference number 8 designates an adaptive filter for generating the pseudo echo signal based on the received signal, the transmission signal, and a judgment signal. Reference number 9 indicates an adder for adding the near-end signal and the pseudo echo signal. Reference number 10 indicates a double-talk detector for generating the judgment signal for judging whether the received signal is in a silent or near-end signal is in a double-talk state based on the received signal, the near-end signal, and a transmission signal, and outputting the judgment signal to the echo canceller 7.

Next, a description will now be given of the operation of the conventional echo processor.

It is assumed that the received signal in digital form is transmitted from a far-end talker and the sound signal from the microphone 4 contains near-end talker speech and echo. The amplifier 5 amplifies the sound signal from the near-end talker. The A/D converter 6 converts the amplified sound signal to the near-end signal. The echo canceller 7 generates the transmit signal by suppressing the echo signal component from the near-end signal and then outputs it.

The received signal from the far-end talker is inputted to both the echo canceller 7 and the double-talk detector 10, and also converted to an analogue signal, namely the sound signal, by the D/A converter 1. The amplifier 2 amplifies the analogue signal and transmits it to the speaker 3. The speaker 3 receives and outputs it as an acoustic.

The microphone 4 inputs a part of the acoustic outputted from the speaker 3 through the echo path, and mixes the inputted one into the sound signal to be transmitted as the echo signal.

The adaptive filter 8 calculates an adaptive filter coefficient based on the received signal and the transmit signal which is fed back in order to generate the pseudo echo signal.

The adder 9 subtracts the pseudo echo signal from the near-end signal, so that the echo signal component in the near-end signal is suppressed and the transmit signal is thereby generated. In this case, the adaptive filter 8 calculates and updates the adaptive filter coefficient successively in order to adapt the change of the characteristic of the echo path.

The double-talk detector 10 judges whether the near-end signal is in the double-talk state or in the silent state, where in the double-talk state the near-end signal includes both the echo signal and the sound signal from the near-end talker simultaneously, and the received signal is in the silent state. The double-talk detector 10 outputs to the adaptive filter 8 the judgment result as the judgment signal.

In order to prevent any deterioration of the calculation accuracy of the adaptive filter coefficient, the adaptive filter 8 halts the update of the adaptive filter coefficient when it is in the double-talk state or the received signal is in the silent state.

For example, a patent document of Japanese laid-open publication number JP-H10/242891 (Reference 1) has disclosed a technique how to detect the double-talk by the double-talk detector 10.

In the patent document, the detection of the double-talk is performed by the following manner.

The double-talk detector 10 calculates a mean power S of the near-end signal, a mean power X of the received signal, and a means power E of the transmission signal, and detects the double-talk state based on a combination of the following equations (1) to (3):

$$X < p1 \quad (1),$$

$$S > p2 \times X (\text{where}, p2 \leq 0.5) \quad (2), \text{ and}$$

$$E > p3 \times S \quad (3).$$

P1, p2, and p3 in the above equations (1) to (3) are predetermined constants and determined according to an environment.

When the equation (1) is satisfied, the detector 10 judges that the received signal is in the silent state.

In addition, when the equation (1) is not satisfied and the equation (2) is satisfied, the detector 10 judges that the near-end signal is in the double-talk state.

Further, when both the equations (1) and (2) are not satisfied and the equation (3) is satisfied, the detector 10 judges that the near-end signal is in the double-talk state where an amount of the echo suppression is small and the amount of the input sound signal other than the echo signal is large.

Another patent document of Japanese laid-open publication number JP-H9/205388 (Reference 2) has disclosed a conventional echo processor. This echo processor suppresses a component of a low frequency region (hereinafter, referred to as a low frequency component) in a background acoustic inputted through the microphone. In order to achieve this function, the echo processor incorporates a high-pass filter following the A/D converter 6 for the transmit signal, and incorporates an additional high-pass filter, having the same function for cutting a same frequency region, following the input side of the adaptive filter. This configuration enables that both the near-end signal and the received signal to be inputted to the adaptive filter 8 have the same frequency properties and the adaptive filter 8 continues the same calculation accuracy for the adaptive filter coefficient.

Because the conventional echo processor such as the conventional echo processor shown in FIG. 1 and the echo processor disclosed in Reference 2 has the configuration described above, there is a possibility to occur a non-linear distortion because the sound vibration of a high frequency component is prevented by a low frequency component, which cannot be reproduced as an acoustic, inputted to the speaker together with the high frequency component.

In this case, a non-linear distortion occurs in the echo signal inputted through the microphone and the calculation accuracy of the adaptive filter coefficient calculated by the adaptive filter 8 is thereby deteriorated. Further, there is a drawback in which the difference between the pseudo echo signal to be generated and the echo signal becomes large, and the amount of the echo suppression becomes reduced.

In order to eliminate the non-linear distortion occurred in the speaker and to efficiently perform a noise cancelling, a Japanese laid-open publication number JP-H6/202669 (Reference 3) has proposed a conventional technique in which a high-pass filter is inserted at a place before the speaker in order to eliminate the low frequency component in advance which cannot be reproduced as an acoustic.

Although it is possible to apply this technique to the conventional echo processor shown in FIG. 1, where the high-pass filter is inserted between the D/A converter 1 and the amplifier 2, a drawback happens, in which the frequency property of the received signal to be inputted into the adaptive filter 8 is greatly different from that of a low frequency band (hereinafter referred to as a low band) of the echo signal outputted from the speaker 3 and then inputted to the microphone 4. The reason why is that the received signal has a low frequency component, but, the echo signal has not. As a result, the adaptive filter 8 outputs the adaptive filter coefficient with low calculation accuracy, and the difference between the pseudo echo signal to be generated and the echo signal becomes large, so that the amount of the echo suppression is reduced.

We will discuss about the case where the method disclosed in Reference 3 in which the high-pass filter is inserted before the speaker is applied to the echo processor shown in Reference 2. In a case in which a high-pass filter is inserted between the D/A converter and the amplifier at the received signal side, it is difficult to match the frequency components of this high-pass filter and both the high-pass filters placed before the adaptive filter and before the adder because the purpose to suppress the low frequency component is different between those high-pass filters. As a result, the drawback occurs that the characteristic of the low frequency component is greatly different between the received signal to be inputted to the adaptive filter and the echo signal to be inputted to the microphone, this deteriorates the calculation accuracy of the adaptive filter coefficient and the difference between the pseudo echo signal and the echo signal becomes large, and the amount of the echo suppression is thereby reduced.

There is a possibility in which the double-talk detector 10 in the conventional echo processor shown in FIG. 1 takes a wrong judgment for the double-talk in cases where the values "S" and "X" are approximately equal in the equation (2), or the values "S" and "E" are approximately equal in the equation (3). For example, when the value "p2" in the equation (2) is set to a low value so that the double-talk is relatively judged in order to avoid an occurrence of the update for the adaptive filter coefficient with a wrong value, the wrong judgment of the double-talk occurs because the power of the echo signal to be mixed into the near-end signal becomes large (S becomes large) in the case where the distance between the speaker 3 and the microphone 4 is narrow or the amplified values of the amplifiers 2 and 5 are large even if a single-talk (X is large) of only the received signal is used.

When the value "p3" in the equation (3) is set to a low value in order to achieve the same purpose, the wrong judgment of the double-talk also occurs because the calculation accuracy of the adaptive filter coefficient by the adaptive filter 8 becomes reduced even if a single-talk (X is large) of only the received signal is used, and the amount of the echo suppression by the echo canceller 7 becomes less, so that the value E becomes increased towards the value S Thus, the conventional echo cancellers involve the drawback in which there is a possibility to occur the wrong judgment because it is difficult to distinct the single-talk and the double-talk apparently. As a result, the wrong judgment to halt and start the update of the adaptive filter coefficient occurs, so that the calculation accuracy of the adaptive filter coefficient is deteriorated and the amount of the echo suppression is thereby reduced.

In order to solve the conventional drawbacks described above, an object of the present invention is to provide an echo processor to reduce a non-linier distortion of acoustics outputted from a speaker, to prevent a deterioration of a calculation accuracy of an adaptive filter coefficient in order to eliminate the difference between a pseudo echo signal and an acoustic echo signal, and to prevent the decreasing of the amount of the echo suppression.

In addition, another object of the present invention is to provide an echo processor for judging a double-talk accuracy, to perform to halt and start the update of the adaptive filter coefficient correctly, and to prevent any occurrence of decreasing of an amount of the echo suppression.

DISCLOSURE OF INVENTION

In carrying out the invention and according to one aspect thereof, there is provided an echo processor having a high-pass filter, a D/A converter, a speaker, a microphone, an A/D converter, and an echo canceller. The high-pass filter suppress a low-frequency component in a received signal in digital form. The D/A converter converts the low-frequency component passed through the high-pass filter to a sound signal. The speaker outputs an acoustic based on the sound signal. The microphone has a possibility to input an acoustic echo outputted from the speaker. The A/D converter converts the sound signal outputted from the microphone to a digital signal. The echo canceller generates a pseudo echo signal based on a low-frequency suppressed received signal obtained through the high-pass filter and generates a transmission signal by subtracting the pseudo echo signal from the digital signal outputted from the A/D converter.

It is thereby possible to reduce a non-linear distortion outputted from the speaker. Further, because the low frequency component in both the acoustic echo to be mixed in the digital signal outputted from the A/D converter and the low-frequency suppressed received signal to be inputted to the echo canceller is suppressed together by the high-pass filter, it is possible to prevent a deterioration of a calculation accuracy of an adaptive filter coefficient in the echo canceller, to set the difference between the pseudo echo signal and the echo signal to a small value, and to prevent any reduction of the suppressing amount of the echo.

According to another aspect of the present invention, there is provided an echo processor having a high-pass filter, a D/A converter, a speaker, a microphone, an A/D converter, an echo canceller, and a double-talk detector. The high-pass filter suppress a low-frequency component in a received signal in digital form. The D/A converter converts the low-frequency component passed through the high-pass filter to a sound signal. The speaker outputs an acoustic based on the sound signal. The microphone has a possibility to input an echo of the acoustic outputted from the speaker. The A/D converter converts the sound signal outputted from the microphone to a digital signal. The echo canceller generates a pseudo echo signal based on a low-frequency suppressed received signal obtained through the high-pass filter and generates a transmission signal by subtracting the pseudo echo signal from the digital signal outputted from the A/D converter. The double-talk detector extracts a low-frequency component in the digital signal outputted from the A/D converter, performs a double-talk judgment based on the low-frequency component, and controls to halt and start the update of a filter coefficient of the echo canceller.

It is thereby possible to reduce a non-linear distortion outputted from the speaker. Further, because the low frequency component in both the acoustic echo to be mixed in the digital signal outputted from the A/D converter and the low-frequency suppressed received signal to be inputted to the echo canceller is suppressed together by the high-pass filter, it is possible to prevent a deterioration of a calculation accuracy of an adaptive filter coefficient in the echo canceller, to set the difference between the pseudo echo signal and the echo signal to a small value, and to prevent any reduction of the amount of the suppressed echo.

Moreover, because the low-frequency component in the digital signal outputted from the A/D converter is extracted and the double-talk judgment is performed based on the low-frequency component extracted, it is possible to judge the double-talk accurately, to halt and start the update of the adaptive filter coefficient correctly, to prevent any deterioration of the adaptive filter coefficient and to further reduce the difference between the pseudo echo signal and the acoustic echo, and to prevent the reduction of the amount of the suppressed echo.

According to another aspect of the present invention, there is provided an echo processor in which it is so formed that the double-talk detector hardly detects the double-talk when the low-frequency component in the digital signal outputted from the A/D converter is small.

It is there by possible to judge the double-talk accurately, to halt and start the update of the adaptive filter coefficient correctly, to prevent any deterioration of the adaptive filter coefficient and to reduce the difference between the pseudo echo signal and the acoustic echo, and to prevent the reduction of the amount of the suppressed echo.

According to another aspect of the present invention, there is provided an echo processor in which it is so formed that the double-talk detector easily detects the double-talk when the low-frequency component in the digital signal outputted from the A/D converter is large.

It is thereby possible to judge the double-talk accurately, to halt and start the update of the adaptive filter coefficient correctly, to prevent any deterioration of the adaptive filter coefficient and to reduce the difference between the pseudo echo signal and the acoustic echo, and to prevent the reduction of the amount of the suppressed echo.

According to another aspect of the present invention, there is provided an echo processor in which the double-talk detector calculates an amount of a background noise component included in the digital signal outputted from the A/D converter, and it is so formed that the double-talk detector easily detects the double-talk when the amount of the low-frequency component in the digital signal is large.

It is thereby possible to judge the double-talk accurately without any occurrence of an error judgment caused by the background noise, to halt and start the update of the adaptive filter coefficient correctly, to prevent any deterioration of the adaptive filter coefficient and to reduce the difference between the pseudo echo signal and the acoustic echo, and to prevent the reduction of the amount of the suppressed echo.

According to another aspect of the present invention, there is provided an echo processor having a noise suppressor to suppress a background noise component in the digital signal outputted from the A/D converter and the double-talk detector inputs the digital signal in which the background noise component has been suppressed.

Even if the near-end signal outputted includes the background noise, it is thereby possible to judge the double-talk accurately without any occurrence of an error judgment caused by the background noise, to halt and start the update of the adaptive filter coefficient correctly, to prevent any deterioration of the adaptive filter coefficient and to reduce the difference between the pseudo echo signal and the acoustic echo, and to prevent the reduction of the amount of the suppressed echo.

According to another aspect of the present invention, there is provided an echo processor in which the double-talk detector has a low-pass filter of a cutoff-frequency corresponding to that of the high-pass filter, through which the low-frequency component in the digital signal outputted from the A/D converter is suppressed.

It is thereby possible to extract the low-frequency component in the digital signal by the echo processor with a simple configuration.

According to another aspect of the present invention, there is provided an echo processor further having a memory and a control CPU. The memory stores a set frequency and the control CPU reads the set frequency stored in the memory and outputs it to the high-pass filter and the double-talk detector. The high-pass filter has a plurality of high-pass filters corresponding to different cutoff-frequencies set in advance and selects one of them in accordance with the set frequency outputted from the control CPU, and the selected one suppresses the low-frequency component in the received signal. The double-talk detector extracts the low-frequency component in the digital signal not more than the set frequency outputted from the control CPU when extracting the low-frequency component in the digital signal outputted from the A/D converter.

It is thereby possible to easily rewrite the set frequency value in the memory and it is not necessary to replace the current high-pass filter with new one according to the change of the cutoff-frequency caused by replacing a kind of the speaker. In addition, the double-talk detector easily changes the cutoff-frequency according to the set-frequency rewritten.

According to another aspect of the present invention, there is provided an echo processor in which the double-talk detector changes according to the set frequency a degree of a contribution in the double-talk judgment using the low-frequency component in the digital signal outputted from the A/D converter It is thereby possible to judge the double-talk accurately without any occurrence of an error judgment caused by the background noise, to halt and start the update of the adaptive filter coefficient correctly, to prevent any deterioration of the adaptive filter coefficient and to reduce the difference between the pseudo echo signal and the acoustic echo, and to prevent the reduction of the amount of the suppressed echo.

According to another aspect of the present invention, there is provided an echo processor in which the double-talk detector has a plurality of low-pass filters corresponding to different cutoff-frequencies set in advance and selects one of them corresponding to the set frequency outputted from the control CPU, and the selected one suppresses the high-frequency component in the digital signal outputted from the A/D converter in order to extract the low-frequency component in the digital signal.

It is thereby possible to extract the low-frequency component in the digital signal with a simple configuration and it is not necessary to replace the current low-pass filter in the double-talk detector with new one according to the change of the cutoff-frequency caused by replacing a kind of the speaker. Thus, it is easily to cope with the change of the cutoff-frequency by rewriting the set-frequency stored in the memory.

BRIEF DESCRIPTION OF DRAWINGS

FIGS. 3A to 3L are diagrams to explain the operation of a high-pass filter in the first embodiment of the present invention.

BEST MODE FOR CARRYING OUT THE INVENTION

The best mode for carrying out the invention will now be described in detail with reference to the accompanying drawings.

First Embodiment

Figure 1:
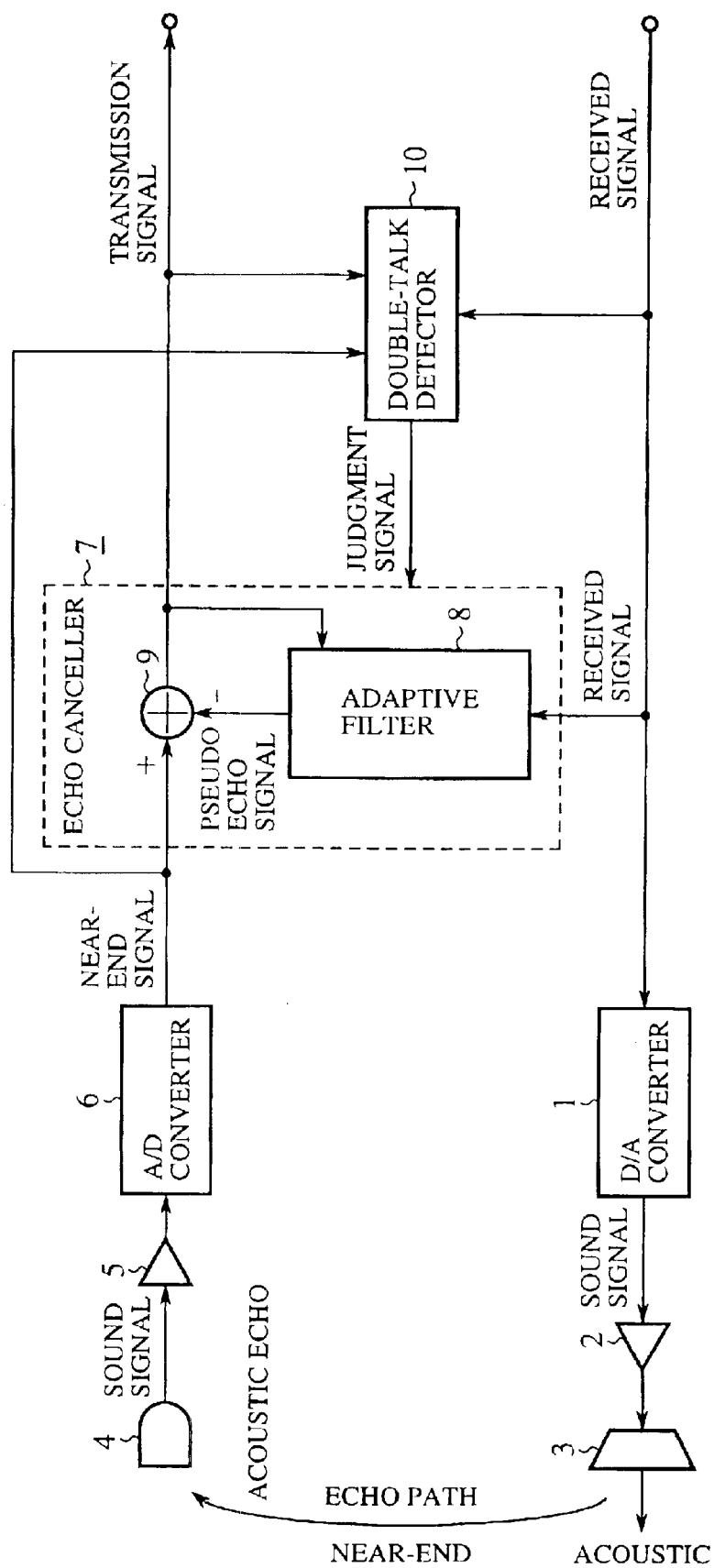
FIG. 1 is a circuit block diagram showing a configuration of a conventional echo processor.
Figure 2:
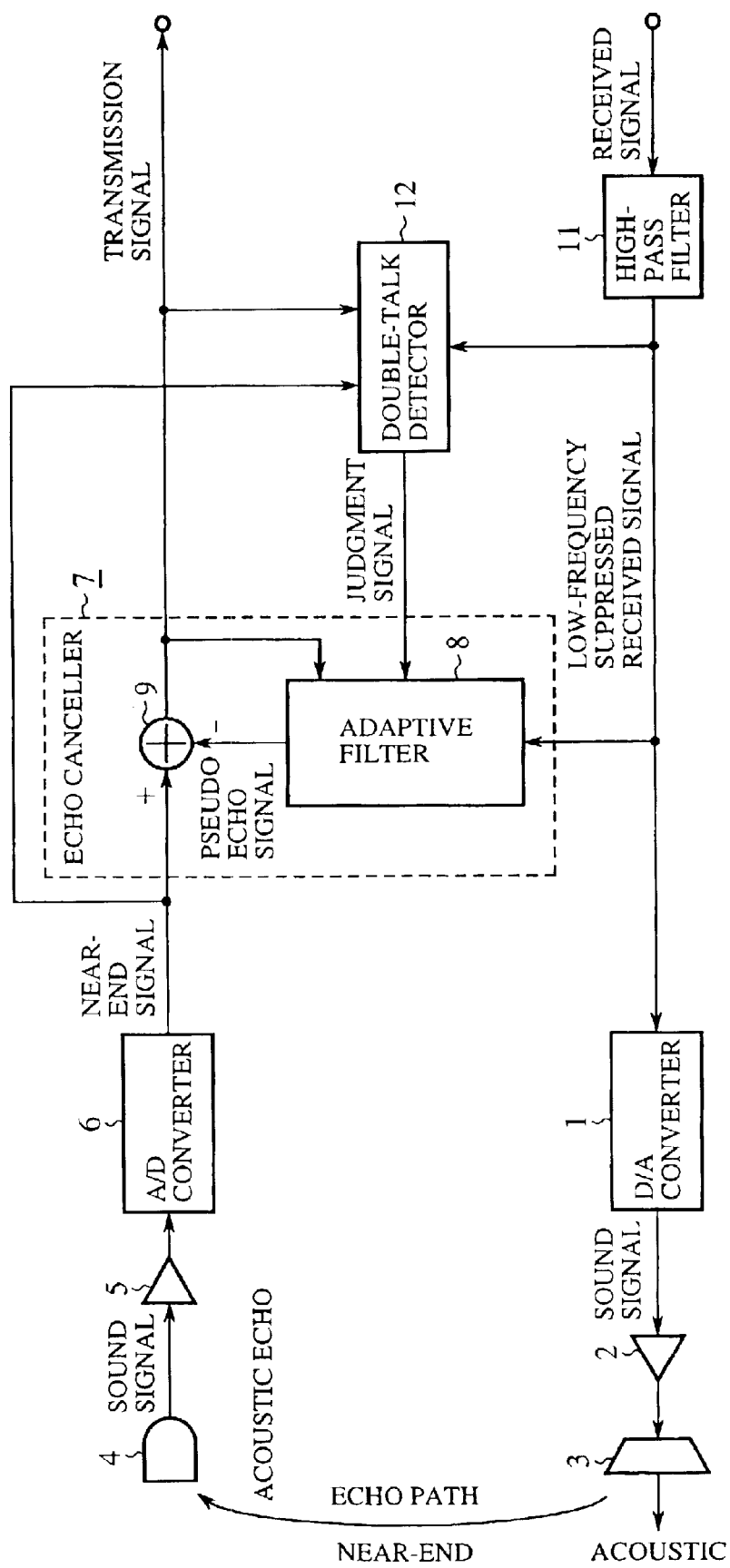
FIG. 2 is a circuit block diagram showing a configuration of an echo processor according to a first embodiment of the present invention.

FIG. 2 is a circuit block diagram showing a configuration of an echo processor according to a first embodiment of the present invention. In the diagram, reference number 11 indicates a high-pass filter for suppressing a low-frequency component in a received signal in a digital form. Reference number 1 designates a digital to analogue (D/A) converter for converting the low-frequency suppressed received signal in digital form to an analogue sound signal, 2 denotes an amplifier for amplifying the sound signal, and 3 indicates a speaker for outputting the acoustic corresponding to the sound signal amplified. Reference number 4 designates a microphone for inputting the acoustic and converting it to a sound signal, 5 denotes an amplifier for amplifying the sound signal, and 6 indicates an analogue to digital (A/D) converter for converting the amplified sound signal to a digital signal. Reference number 7 designates an echo canceller for generating a pseudo echo signal based on the low-frequency suppressed received signal passed through the high-pass filter 11, subtracting the pseudo echo signal from the digital signal converted by and then outputted from the A/D converter in order to eliminate the echo signal component from the near-end signal transferred from the A/D converter 6, and to output the transmission signal where the echo component has been eliminated.

In the echo canceller 7, reference number 8 designates an adaptive filter for generating a pseudo echo signal by using a low-frequency suppressed received signal, the transmission signal, and a judgment signal. Reference number 9 indicates an adder for adding the digital signal from the A/D converter 6 and the pseudo echo signal. Reference number 12 indicates a double-talk detector for judging a silent state or a double-talk state of the received signal based on the low-frequency suppressed received signal, the near-end signal, and a transmission signal, and then outputting the judgment signal to the echo canceller 7.

Next, a description will now be given of the operation of the echo processor.

When inputting the received signal, the high-pass filter 11 suppresses the low-frequency component of not less than a cutoff-frequency of the high-pass filter 11 in the received signal, and then outputs a low-frequency suppressed received signal.

This low-frequency suppressed received signal is outputted to the double-talk detector 12 in addition to the adaptive filter 8 and the D/A converter 1.

Here, the high-pass filter 11 comprises an eighth-order IIR type digital filter. The cutoff-frequency of the high-pass filter 11 is so set according to the lower limit frequency the speaker 3 can reproduce, which has been detected in advance. When the lower limit frequency of the speaker 3 is 400 Hz, a coefficient of the digital filter is so set that the cutoff-frequency is 400 Hz.

FIGS. 3A to 3L are diagrams to explain the operation of a high-pass filter in the first embodiment of the present invention. FIGS. 3A to 3C show the operation examples of the high-pass filter 11. FIG. 3A shows a frequency characteristic when the received signal is a sound signal, FIG. 3B shows a response characteristic of the high-pass filter 11, and FIG. 3C shows a frequency characteristic of the low-frequency suppressed received signal outputted from the high-pass filter 11, where fc is a cutoff-frequency of the high-pass filter 11.

The D/A converter 1 inputs the low-frequency suppressed received signal and converts it to an analogue signal, namely, a sound signal. The amplifier 2 amplifies the sound signal, and the speaker 3 outputs the amplified sound signal as an acoustic. Because the low frequency component which the speaker 3 cannot reproduce has already been suppressed by the high-pass filter 11, the speaker 3 can output the acoustic without non-linear distortion. Therefore there is not any non-linear distortion in the acoustic echo obtained through the microphone 4.

The adaptive filter 8 calculates an adaptive filter coefficient based on the low-frequency suppressed received signal and the transmission signal, and generates a pseudo echo signal. The adder 9 subtracts the pseudo echo signal from the near-end signal.

By using the manner described above, because the acoustic echo does not involve any non-linear distortion and the low-frequency suppressed received signal to be inputted to the adaptive filter 8 has been similarly suppressed at the low frequency the high-pass filter 11, it is possible to calculate accurately the adaptive filter coefficient and to generate the pseudo echo signal that is approximately equal to an actual echo signal.

The double-talk detector 12 judges the double-talk based on the low-frequency suppressed received signal, the near-end signal, and the transmission signal.

Hereinafter, the operation of the double-talk detector 12 will be explained in detail.

The double-talk detector 12 samples the level of each of following signals during a constant time length and calculates the mean of the value squared using the sample number in order to obtain the mean power Xh of the low-frequency suppressed received signal, the mean power S of the near-end signal, and the mean power E of the transmission signal. The component of the high-frequency region (hereinafter referred to as a high-frequency component) in the near-end signal and the low-frequency suppressed received signal is suppressed by a low-pass filter in order to extract the low-frequency component thereof. For example, the low-pass filter is made up of an eighth-order IIR type digital filter. At this time, the cutoff-frequency of the low-pass filter is set to the same cutoff-frequency of the high-pass filter 11.

The mean of the sum of the sample value squared is calculated using the sample number for each of parameters S1 and X1, where S1 is the mean power of the near-end signal whose high-frequency component is suppressed by the low-pass filter, and X1 is the mean power of the low-frequency component whose high-frequency component is suppressed by the low-pass filter.

In addition, the double-talk detector 12 extracts the minimum value in the mean powers S of the near-end signal during the constant time period (for example, during one second) as the background noise power Ns unless the near-end signal obtained during the time period has no periodic characteristic.

The judgment result regarding the presence/absence of the periodic characteristic can be obtained by judging the maximum value of an auto correlation coefficient of the near-end signal with a threshold value. When the auto-correlation coefficient of the near-end signal is over the threshold value, the near-end signal has the periodic characteristic, and if not over it, the near-end signal has no periodic characteristic.

When the mean power S is more than a threshold value that is set in advance based on the background noise power Ns, the period of the near-end signal having the periodic characteristic is detected as the sound field. For example, the mean power in the sound field during a last one second is Vs, and it is so obtained that the ratio of Vs and Ns (Vs/Ns) is Rs.

Following this, the double-talk detector 11 detects the double-talk using following equations (4) to (7).

$$Xh < p1 \quad (4),$$

$$S > p2 \times Xh (p2 < 0.5) \quad (5),$$

$$E > p3 \times S \quad (6), \text{ and}$$

$$S1 > p4 \times X1.$$

When the equation (4) is satisfied, it is judged that the received signal is in a silent state.

When the equation (4) is not satisfied and both the equations (5) and (7) are satisfied, it is judged that the double-talk occurs.

When both the equations (4) and (5) are not satisfied and both the equations (6) and (7) are satisfied, it is judged that the double-talk occurs under the condition where the volume of the echo suppression is small and there are many input sounds other than the echo signal.

Where, P1, p2, and p3 for use in the equations (4) to (7) are constant values and determined according to the environment in use. For example, it is determined that $p1=100^2$, $p2=0.5$, and $p3=0.5$. The value p4 is a variable that is changed according to the value Rs previously obtained.

When Rs is large, for example, in a case it is over $36^2$ that is, when the background noise is small, p4 is set to 1.0. When Rs is not over $36^2$, namely, when the volume of the background noise is large, p4 is set to 1.5.

Although it is judged in the equation (4) whether the received signal is in the silent state using the mean power Xh of the low-frequency suppressed received signal, it is possible to insert the mean power X of the received signal at the point before the high-pass filter 11 into the equation (4).

Hereinafter, the operation of the double-talk detector 12 for detecting the double-talk will be explained in detail with reference to FIGS. 3A to 3L.

In the diagrams of FIGS. 3A to 3L, as previously described, FIG. 3A shows an example of the frequency characteristic when the received signal is in the silent state, FIG. 3B shows a response characteristic of the high-pass filter 11, FIG. 3C shows a frequency characteristic of the low-frequency suppressed received signal, FIG. 3D shows the frequency characteristic of the low-frequency suppressed received signal, like the case of FIG. 3C, and FIG. 3E shows a response characteristic of the low-pass filter in the double-talk detector 12 in which the cutoff-frequency fc is the same of that of the high-pass filter 11. FIG. 3F shows an output of the low-pass filter through which the signal shown in FIG. 3D is passed. Although the mean power of the output of the low-pass filter shown in FIG. 3F corresponds to X1 in the equation (7), X1 takes a small value because the high-pass filter 11 suppresses the low frequency component.

Further, FIG. 3G shows a frequency characteristic of only the echo component in the sound signal outputted from the microphone 4, where the speaker 3 firstly inputs the low-frequency suppressed received signal having the frequency characteristic of FIG. 3C, and then outputs an acoustic, and the microphone 4 inputs this acoustic through the echo path.

FIG. 3H shows a response characteristic of the low-pass filter in the double-talk detector 12 having the same response characteristic of that shown in FIG. 3E. FIG. 3I shows the output of this low-pass filter. The mean power of the output of the low-pass filter shown in FIG. 3I corresponds to the value S1 used in the equation (7). In this case, S1 becomes a small value, like X1, because the near-end signal has only the echo signal, no sound signal from a near-end talker.

Further, FIG. 3J shows a frequency characteristic of a case where the near-end signal includes the echo signal and the sound signal from a near-end talker. FIG. 3K shows a response characteristic of the low-pass filter in the double-talk detector 12, which is the same of the case shown in FIG. 3E. Finally, FIG. 3L shows an output of this low-pass filter.

Because the mean power of the low-pass filter output shown in FIG. 3I corresponds to S1 used in the equation (7), in this case, because the near-end signal involves the low frequency component generated by the sound signal from the near-end talker, the output of the low-pass filter becomes a larger value when compared with S1 in the output of the low-pass filter of FIG. 3I including only the echo signal.

By using a characteristic difference between the outputs shown in FIG. 3I and FIG. 3L of the low-pass-filter, the double-talk detector 12 judges that the near-end signal is a single-talk including only the echo signal when the value S1 is a small value, nearly equal to X1, namely, the equation (7) is not satisfied. When S1 is a value adequately greater than X1, namely, the equation (7) is satisfied, the double-talk detector 12 judges that the near-end signal is the double-talk including both the echo signal and the sound signal of a near-end talker.

Because S1 is the power of the low-frequency component in the near-end signal, S may be the power of the whole band in the near-end signal. However, the double-talk detector 12 does not determine the double-talk state unless the equation (7) using S1 is satisfied even if both the equations (5) and (6) using S are satisfied. Therefore the echo processor of the present invention can reduce the occurrence of the error judgment, where it is judged that the sound signal including only the echo signal is the double-talk, instead of the single-talk, as many as possible when compared with the conventional one. In a case where the volume of the background noise is small the echo processor easily judges the double-talk because it can judge that S1 has a small background noise and the reliability of the value S1 is high.

The double-talk detector 12 judges whether the received signal is in the silent state or the double-talk state based on the conditions descried above, and transmits the judgment signal to the adaptive filter 8. The adaptive filter 8 receives the judgment signal and halts to update the adaptive filter coefficient in the case of the double-talk state or the silent state. Thereby it is possible to prevent any occurrence of the deterioration of the adaptive filter coefficient. The adaptive filter 8 starts to update the adaptive filter coefficient when the received signal is not in the double-talk state and the silent state.

As described above, according to the first embodiment, the low-frequency component in the received signal, the speaker 3 cannot reproduce this component, is suppressed by the high-pass filter, and the adaptive filter 8 also inputs the output from the high-pass filter 11. It is thereby possible to reduce the non-linear distortion in the echo signal outputted from the speaker 3, to prevent the deterioration of the calculation accuracy of the adaptive filter coefficient calculated by the adaptive filter 8 so that the difference between the pseudo echo signal and the echo signal becomes small, and thereby possible to prevent the reduction of the volume of the echo suppression.

In addition, because the double-talk is detected using the near-end signal including the echo signal whose low-frequency component is suppressed by the high-pass filter 11, it is possible to judge the double-talk with high precision and to halt and start the update of the adaptive filter coefficient correctly, to prevent the deterioration of the precision of the adaptive filter coefficient, to reduce the difference between the pseudo echo signal and the echo signal, and to prevent the reduction of the volume of the echo suppression.

Furthermore, because the low-pass filter extracts the low-frequency component in the near-end signal and the low-frequency suppressed received signal, it is possible to obtain the low-frequency component in the near-end signal and the low-frequency suppressed received signal by a relatively simple process.

Second Embodiment

The double-talk detector 12 of the first embodiment performs to judge the double-talk when the following both cases:

The equation (4) is not satisfied and both the equations (5) and (7) are satisfied; and Both the equations (4) and (5) are not satisfied and both the equations (6) and (7) are satisfied.

However, in a case when Rs is large, namely over $36^2$, that is, when the background noise is smaller, the equation (4) is not satisfied and the equation (7) is satisfied. Accordingly, when the above condition is established, it is possible to judge the double-talk regardless of the result of both the equations (5) and (6). Accordingly, when the background noise is small, it is possible to judge the double-talk correctly even if S or E is small and to prevent the occurrence of the error detection where the case including the large background noise is judged as the double-talk.

As described above, according to the second embodiment, because the high-pass filter 11 suppresses the low-frequency component in the echo signal included in the near-end signal, the double-talk is judged using mainly the low-frequency component in the near-end signal when the background noise component included in the near-end signal is small. Thereby, it is possible to judge the double-talk with high precision and to halt and start the update of the adaptive filter coefficient correctly, to prevent the deterioration of the precision of the adaptive filter coefficient, to reduce the difference between the pseudo echo signal and the echo signal, and to prevent the reduction of the volume of the echo suppression.

Third Embodiment

Figure 4:
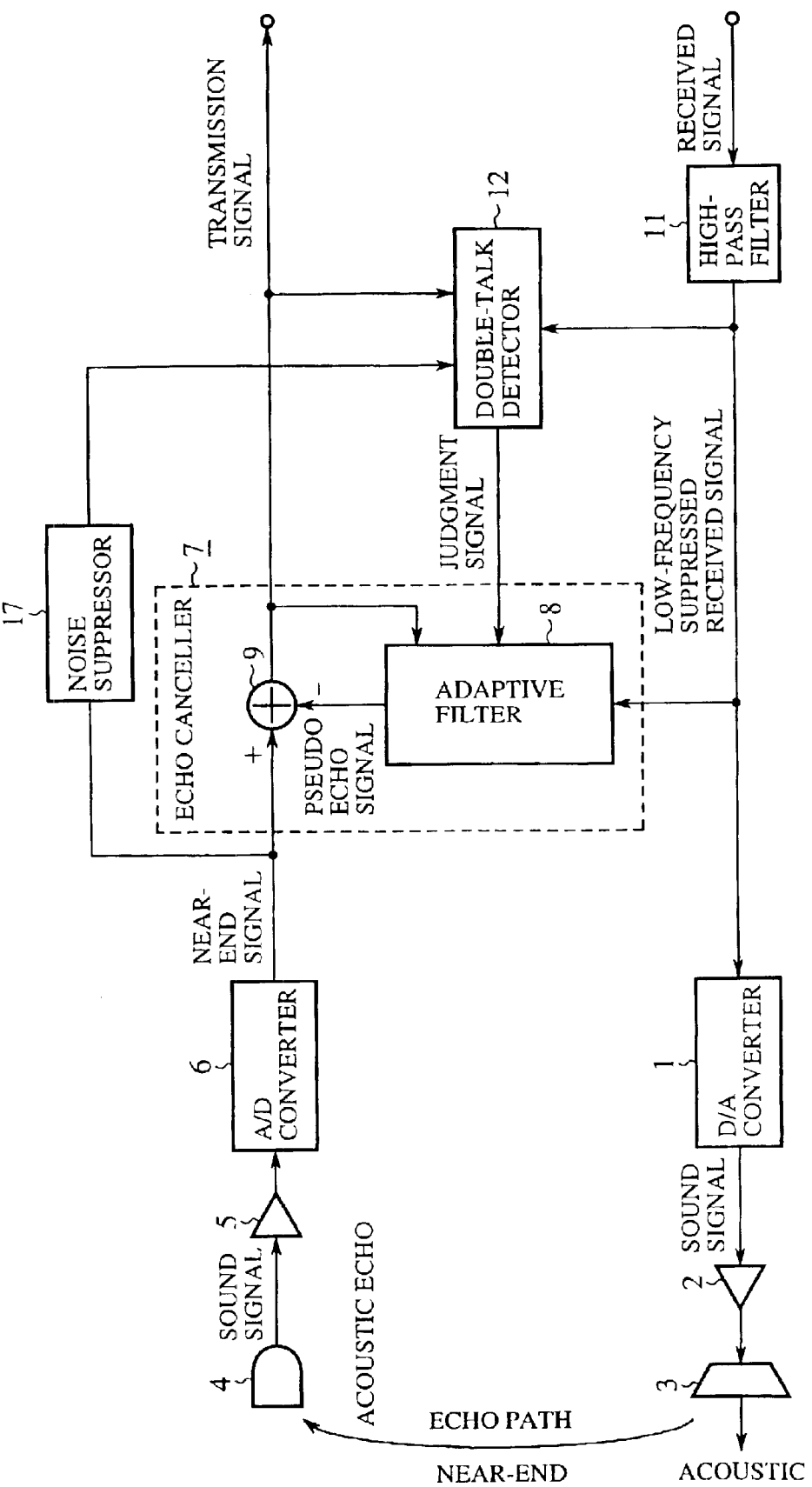
FIG. 4 is a circuit block diagram showing a configuration of an echo processor according to a third embodiment of the present invention.

FIG. 4 is a circuit block diagram showing a configuration of an echo processor according to a third embodiment of the present invention. In the diagram, reference number 17 designates a noise suppressor. Other components are the same of those shown in FIG. 2. The double-talk detector 12 performs the same operation of that in the second embodiment.

Next, a description will now be given of the operation of the conventional echo processor.

The noise processor 17 inputs the near-end signal from the A/D converter 6 and suppresses the background noise component included in the near-end signal and outputs the near-end signal including the component other than the suppressed one.

There is a literature (Reference 4) that disclosed a spectral subtraction method as an example how to suppress the background noise component included in the near-end signal.

Reference 4: Steven F. Boll, "Suppression of Acoustic noise in speech using spectral subtraction". IEEE Trans. ASSP. Vol. ASSP-27, No.2, April 1979.

Because the noise suppressor 17 reduces the volume of the background noise component included in the near-end signal, Rs to be calculated becomes large, and the number of cases where Rs is over $36^2$ is increased. Accordingly, it is possible to judge the case, as the double-talk, when the equation (4) is not satisfied and the equation (7) is satisfied regardless of the result of both the equations (5) and (6). Therefore this increases the possibility to detect the double-talk correctly even if S or E is small.

Because the noise suppressor 17 is incorporated and placed at a position where the echo canceller 7 is bypassed and it suppresses the background noise component in the output signal to be inputted to the double-talk detector 12, it does not occur any deterioration of the pseudo echo signal generated by the adaptive filter 8 even if the noise suppressor 17 is incorporated.

As described above, according to the third embodiment, because the noise suppressor 17 suppresses this background noise component from the near-end signal, even if the near-end signal includes the background noise, it is possible to judge the double-talk with high precision and to halt and start the update of the adaptive filter coefficient correctly, to prevent the deterioration of the precision of the adaptive filter coefficient, to reduce the difference between the pseudo echo signal and the echo signal, and to prevent the reduction of the volume of the echo suppression.

Fourth Embodiment

Figure 5:
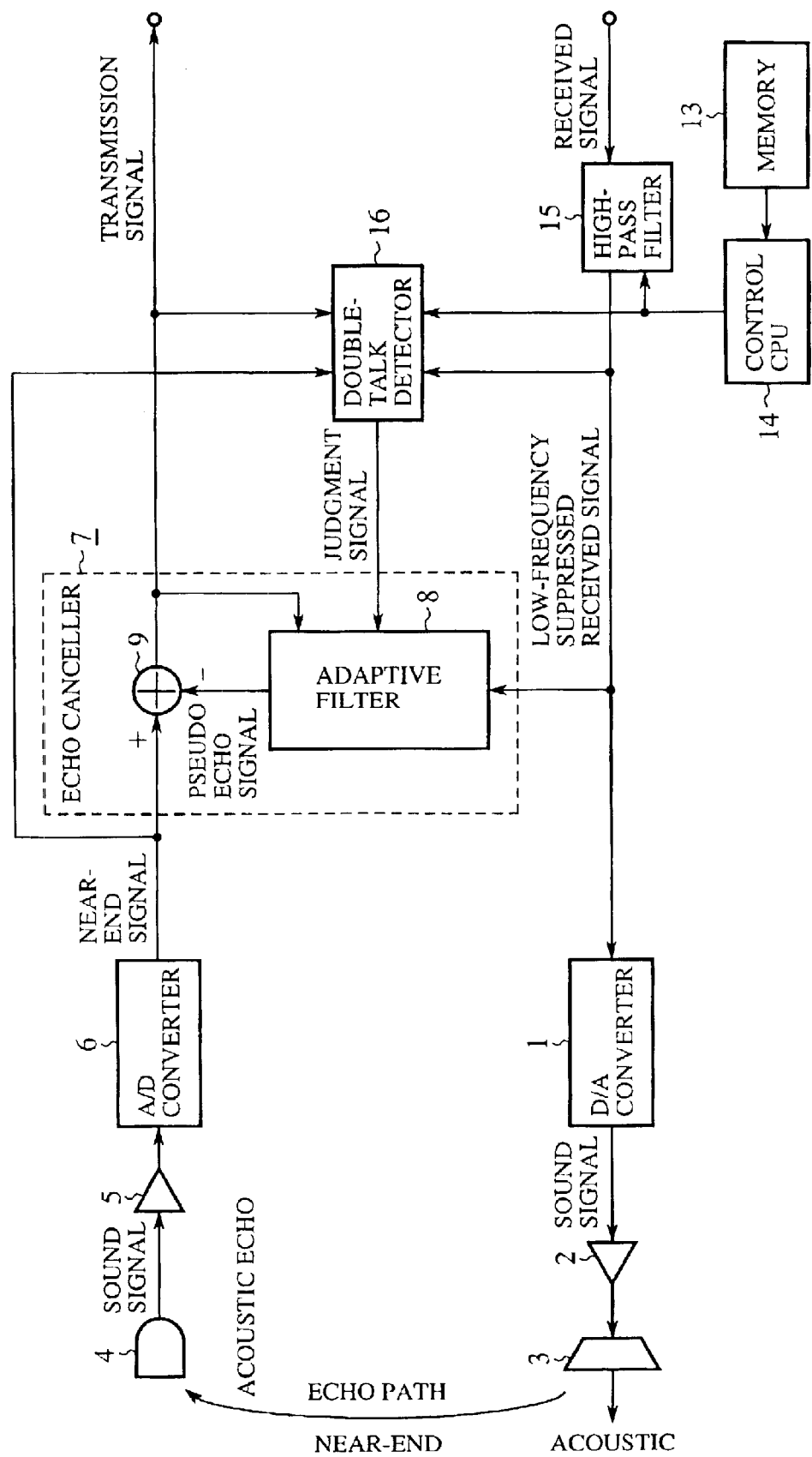
FIG. 5 is a circuit block diagram showing a configuration of an echo processor according to a fourth embodiment of the present invention.

FIG. 5 is a circuit block diagram showing a configuration of an echo processor according to a fourth embodiment of the present invention. In the diagram, reference number 13 designates a memory for storing a setting frequency, and 14 denotes a control CPU for reading the set frequency stored in the memory 13 and outputs the read one to the high-pass filter 15 and the double-talk detector 16. The high-pass filter 15 comprises a plurality of filter elements having different cutoff-frequencies. The high-pass filter 15 selects one of the cutoff-frequencies corresponding to the set frequency outputted from the control CPU 14. The double-talk detector 16 comprises a low-pass filter made up of a plurality of filter elements having different cutoff-frequencies. The double-talk detector 16 selects one of the cutoff-frequencies corresponding to the set-frequency outputted from the control CPU 14. Other components are the same of those shown in FIG. 2.

Next, a description will now be given of the operation of the echo processor.

In general, the lower limit of the lower-frequency the speaker 3 reproduces is different in performance thereof. The high-pass filter 15 incorporates filter elements having different cutoff-frequencies in advance, which correspond to the lower limit frequencies to be able to reproduce by the speaker 3. For example, when the lower limit frequency the speaker 3 reproduces is within a range of 300 Hz to 600 Hz, the high-pass filter 15 incorporates filter elements of four types of the cutoff-frequencies, 300 Hz, 400 Hz, 500 Hz, and 600 Hz at 100 Hz intervals. Similarly, the double-talk detector 16 incorporates the low-pass filter having filter elements of four types of the cutoff-frequencies of 300 Hz to 600 Hz at 100 Hz intervals.

The memory 13 is made up of a ROM for storing a lower limit frequency the speaker 3 reproduces, which is measured and determined in design process. The lower limit frequency is stored in the ROM as the memory in the manufacture. The control CPU 14 reads the set-frequency value stored in the memory 13 and outputs the read one to both the high-pass filter 15 and the double-talk detector 16.

The high-pass filter 15 selects the filter element corresponding to the cutoff-frequency of 400 Hz when the set frequency is 400 Hz, for example. The high-pass filter 15 then suppress the low-frequency component in the received signal, and outputs the received signal suppressed as the low-frequency suppressed received signal.

Similarly, the double-talk detector 16 selects the filter element having the cutoff-frequency corresponding to the set-frequency and suppressed the high-frequency component in both the near-end signal and the lower-frequency suppressed received signal. The double-talk detector 16 calculates X1, S, S1, and E by the same manner of the double-talk detector 12, which has been explained with reference to FIG. 2, and then judges the double-talk using the following equations (8) to (10).

$$Xh < p1 \quad (8),$$

$$S + \alpha(S1 - p4 \times X1) > p2 \times Xh \text{ (where } p2 \leq 0.5) \quad (9), \text{ and}$$

$$E > p3 \times S \quad (10).$$

When the equation (8) is established, it is judged that the received signal is in the silent state.

When the equation (8) is not satisfied and the equation (9) is satisfied, it is judged that the double-talk occurs.

When both the equations (8) an (9) are not satisfied and the equation (10) is satisfied, it is judged that the double-talk occurs under the condition where the volume of the echo suppression is small and there are many input sounds other than the echo signal.

Here, P1 to p4 used in the equations (8) to (10) are constant values and determined according to the environment in use. For example, it is determined that $p1=100^2$, $p2=0.5$, $p3=0.5$, and $p4=1.0$. Although it is checked whether or not the received signal is in the silent state using the mean power Xh of the low-frequency suppressed received signal in the equation (8), it is possible to calculate the mean power X of the received signal before passed through the high-pass filter 15 and to insert the calculated one into the equation (8).

The value $\alpha$ in the equation (9) is a parameter indicating the degree of the contribution to the equation (9) regarding the powers S1 and X1 of the low-frequency components in both the near-end signal and the low-frequency suppressed received signal. When the set frequency transferred from the control CPU is high, the value $\alpha$ is set to a high value, and when small, set to a low value. For example, the value $\alpha$ is set to 1.0 ($\alpha=1.0$) when the set frequency is 300 Hz, the value $\alpha$ is set to 1.2 ($\alpha=1.2$) when 400 Hz, and the value $\alpha$ is set to 1.5 ($\alpha=1.5$) when 600 Hz.

This means that when the set frequency, namely the lower limit frequency becomes high, the difference of S1 is increased between both the case where the near-end signal includes only the echo signal and the case where it includes the echo signal and the sound signal from a near-end talker, and the reliability of S1 to judge the double-talk is thereby increased. Thus, by increasing the value $\alpha$ regarding the degree of the contribution by the parameter S1 of a high reliability, it is possible to improve the precision of the judgment for the double-talk.

Figure 6A:
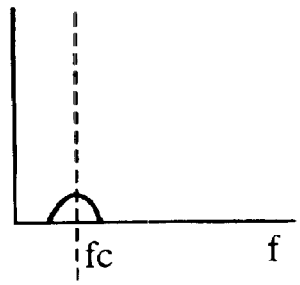
FIGS. 6A to 6D are diagrams to explain the operation of a high-pass filter in the fourth embodiment of the present invention.
Figure 6B:
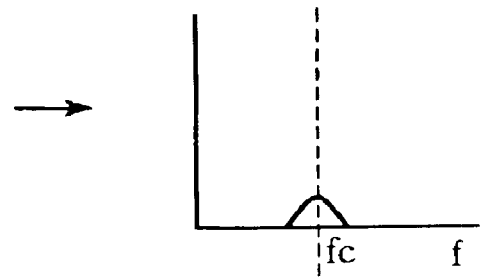
Figure 6C:
Figure 6D:
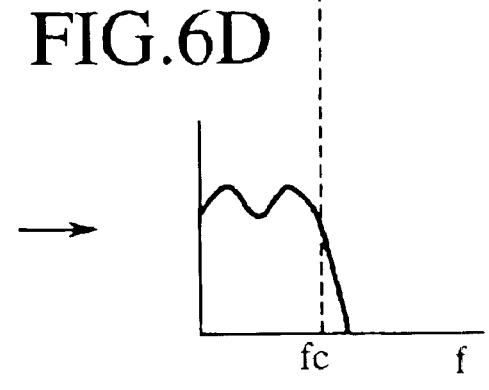

FIGS. 6A to 6D are diagrams to explain the operation of the high-pass filter in the fourth embodiment of the present invention. The diagram shows the frequency characteristic of the near-end signal passed through the low-pass filter in the double-talk detector 16. In the diagram, FIG. 6A shows a case where the near-end signal includes only the echo signal and the lower limit frequency of the low-pass filter is low, FIG. 6B shows a case where the same near-end signal of FIG. 6A is used and the lower limit frequency of the low-pass filter is high, FIG. 6C shows a case where the near-end signal includes the echo signal and the sound signal from a near-end talker and the lower limit frequency in the low-pass filter is low, and FIG. 6D shows a case where the same near-end signal shown in FIG. 6C is used and the lower limit frequency in the low-pass filter is high. FIGS. 6A to 6D clearly indicate that the difference between the cases of FIG. 6B and FIG. 6D is larger in power than that between the cases of FIG. 6A and FIG. 6C, and the reliability of S1 becomes high when the lower limit frequency in the low-pass filter is higher.

As described above, according to the fourth embodiment, the high-pass filter 15 incorporates a plurality of filter elements having different cutoff-frequencies, and double-talk detector 16 incorporates the low-pass filter having a plurality of filter elements having different cutoff-frequencies, and the cutoff-frequency in both the high-pass filter and the low-pass filter is switched according to the information regarding the set frequency stored in the memory 13. Accordingly, it is not necessary to incorporate any additional high-pass filter and the low-pass filter even if the type of the speaker 3 is changed. It is possible to easily deal with the change of the kind of the speaker 3 by rewriting the value of the set frequency stored in the memory 13.

In addition, because the degree of the contribution of the power of the low-frequency component in the near-end signal in the equations for use in the judgment of the double-talk is changed according to the cutoff-frequency in each of the high-pass filter and the low-pass filter, it is possible to judge the double-talk with high precision, and to halt and start the update of the adaptive filter coefficient correctly, to prevent the deterioration of the precision of the adaptive filter coefficient, to reduce the difference between the pseudo echo signal and the echo signal, and to prevent the reduction of the volume of the echo suppression.

Fifth Embodiment

The double-talk detectors 12 and 16 in the first to fourth embodiments obtain the power of the low-frequency component by suppressing the high-frequency component in the near-end signal through the low-pass filter. Instead of this manner, it is possible to obtain the power of the low frequency component by changing the near-end signal to a power spectrum based on fast Fourier transformation (FFT) and then adding the component of the power spectrum of not more than the cutoff-frequency.

As described above, according to the fifth embodiment, because the power of the low frequency component is obtained on the frequency axis using FFT, it is possible to obtain the power of the low frequency component by clearly cutting the lower-frequency component having no slope when compared with the low-pass filter characteristic, shown in FIG. 3H, namely, with the low-pass filter whose suppress characteristic has a few slope following the value of the cutoff-frequency. This can obtain the power of the low-frequency component with high accuracy.

INDUSTRIAL APPLICABILITY

As described, the echo processor according to the present invention is suitable for reducing the acoustic echo outputted from the speaker and then inputted to the microphone through the echo path.

What is claimed is:

1. An echo processor comprising:
a high-pass filter configured to suppress a low-frequency component in a received signal in digital form;
a D/A converter configured to convert the low-frequency suppressed received signal obtained through the high-pass filter to a sound signal;
a speaker configured to output an acoustic based on the sound signal;
a microphone configured to input an echo of the acoustic output from the speaker;
an A/D converter configured to convert the sound signal output from the microphone to a digital signal;
an echo canceller configured to generate a pseudo echo signal based on the low-frequency suppressed received signal obtained through the high-pass filter and configured to generate a transmission signal by subtracting the pseudo echo signal from the digital signal output from the A/D converter; and
a double-talk detector configured to receive the low-frequency suppressed received signal obtained through the high-pass filter and configured to perform a double-talk judgment based on the low-frequency suppressed received signal obtained through the high-pass filter.

2. An echo processor comprising:
a high-pass filter configured to suppress a low-frequency component in a received signal in digital form;
a D/A converter configured to convert the low-frequency suppressed received signal obtained through the high-pass filter to a sound signal;
a speaker configured to output an acoustic based on the sound signal;
a microphone configured to input an echo of the acoustic output from the speaker;
an A/D converter configured to convert the sound signal output from the microphone to a digital signal;
an echo canceller configured to generate a pseudo echo signal based on the low-frequency suppressed received signal obtained through the high-pass filter and configured to generate a transmission signal by subtracting the pseudo echo signal from the digital signal output from the A/D converter; and
a double-talk detector configured to receive the low-frequency suppressed received signal obtained through the high-pass filter, configured to extract a low-frequency component in the digital signal output from the A/D converter, configured to perform a double-talk judgment based on the low-frequency component and the low-frequency suppressed received signal obtained through the high-pass filter, and configured to halt and start an update of a filter coefficient of the echo canceller.

3. The echo processor according to claim 2, wherein the double-talk detector is configured to hardly detect a double-talk when the low-frequency component in the digital signal output from the A/D converter is small.

4. The echo processor according to claim 2, wherein the double-talk detector is configured to easily detect a double-talk when the low-frequency component in the digital signal output from the A/D converter is large.

5. The echo processor according to claim 2, wherein the double-talk detector is configured to calculate an amount of a background noise component included in the digital signal output from the A/D converter, and the double-talk detector is configured to easily detect a double-talk when an amount of the low-frequency component in the digital signal is large.

6. The echo processor according to claim 2, further comprising a noise suppressor configured to suppress a background noise component in the digital signal output from the A/D converter, and the double-talk detector being configured to easily input a digital signal in which the background noise component has been suppressed.

7. The echo processor according to claim 2, wherein the double-talk detector is configured to extract the low-frequency component in the digital signal output from the A/D converter by a low-pass filter of a cutoff-frequency corresponding to a cutoff-frequency of the high-pass filter.

8. The echo processor according to claim 2, further comprising:
a memory; and
a control CPU,
wherein the memory is configured to store a set frequency,
the control CPU is configured to read the set frequency stored in the memory and is configured to output the stored set frequency to the high-pass filter and the double-talk detector,
the high-pass filter includes a plurality of high-pass filters corresponding to different cutoff-frequencies set in advance and is configured to select one high-pass filter in the plurality of high-pass filters corresponding to the set frequency output from the control CPU, and the selected high-pass filter is configured to suppress the low-frequency component in the received signal, and
the double-talk detector is configured to extract a low-frequency component in the digital signal having a frequency less than or equal to the set frequency output from the control CPU when extracting the low-frequency component in the digital signal output from the A/D converter.

9. The echo processor according to claim 8, wherein the double-talk detector is configured to change a degree of a contribution of the low-frequency component in the digital signal output from the A/D converter in the double-talk judgment.

10. The echo processor according to claim 8, wherein the double-talk detector includes a plurality of low-pass filters corresponding to different cutoff-frequencies set in advance and is configured to select one low-pass filter in the plurality of low-pass filters corresponding to the set frequency output from the control CPU, and the selected one low-pass filter is configured to suppress a high-frequency component in the digital signal output from the A/D converter to extract the low-frequency component in the digital signal.

11. An echo processor comprising:

a high-pass filter configured to suppress a low-frequency component in a received signal in digital form;

a D/A converter configured to convert the low-frequency suppressed received signal obtained through the high-pass filter to a sound signal;

a speaker configured to output an acoustic based on the sound signal;

a microphone configured to input an echo of the acoustic output from the speaker;

an A/D converter configured to convert the sound signal output from the microphone to a digital signal;

an echo canceller configured to generate a pseudo echo signal based on the low-frequency suppressed received signal obtained through the high-pass filter and configured to generate a transmission signal by subtracting the pseudo echo signal from the digital signal output from the A/D converter;

a double-talk detector configured to extract a low-frequency component in the digital signal output from the A/D converter, configured to perform a double-talk judgment based on the low-frequency component, and configured to halt and start an update of a filter coefficient of the echo canceller;

a memory; and a control CPU, wherein the memory is configured to store a set frequency, the control CPU is configured to read the set frequency stored in the memory and is configured to output the stored set frequency to the high-pass filter and the double-talk detector, the high-pass filter includes a plurality of high-pass filters corresponding to different cutoff-frequencies set in advance and is configured to select one high-pass filter in the plurality of high-pass filters corresponding to the set frequency output from the control CPU, and the selected high-pass filter is configured to suppress the low-frequency component in the received signal, and the double-talk detector is configured to extract a low-frequency component in the digital signal having a frequency less than or equal to the set frequency output from the control CPU when extracting the low-frequency component in the digital signal output from the A/D converter.

12. An echo processor comprising:

means for suppressing a low-frequency component in a received signal in digital form;

means for converting the low-frequency suppressed received signal obtained through the means for suppressing to a sound signal;

means for outputting an acoustic based on the sound signal;

means for inputting an echo of the acoustic output from means for outputting;

means for converting the sound signal output from means for inputting to a digital signal;

means for generating a pseudo echo signal based on the low-frequency suppressed received signal obtained through the means for suppressing and for generating a transmission signal by subtracting the pseudo echo signal from the digital signal output from the means for converting; and means for receiving the low-frequency suppressed received signal obtained through the means for suppressing and for performing a double-talk judgment based on the low-frequency suppressed received signal obtained through the means for suppressing.

* * * * *